United States Patent
Abdulaal et al.

(10) Patent No.: US 12,367,509 B2
(45) Date of Patent: Jul. 22, 2025

(54) MARKUP OPTIMIZATION

(71) Applicant: Shipt, Inc., Birmingham, AL (US)

(72) Inventors: Ahmed Abdulaal, San Jose, CA (US); Hari Narayan, Park Ridge, IL (US); Ritesh Agrawal, Pleasanton, CA (US); Suprabha Baniya, Austin, TX (US)

(73) Assignee: Shipt, Inc., Birmingham, AL (US)

( * ) Notice: Subject to any disclaimer, the term of this patent is extended or adjusted under 35 U.S.C. 154(b) by 94 days.

(21) Appl. No.: 17/966,654

(22) Filed: Oct. 14, 2022

(65) Prior Publication Data

US 2024/0127277 A1    Apr. 18, 2024

(51) Int. Cl.
*G06Q 30/0201* (2023.01)
*G06N 3/08* (2023.01)
(Continued)

(52) U.S. Cl.
CPC .......... *G06Q 30/0206* (2013.01); *G06N 3/08* (2013.01); *G06Q 10/04* (2013.01); *G06Q 10/08345* (2013.01); *G06Q 30/0633* (2013.01)

(58) Field of Classification Search
CPC ......... G06Q 30/0206; G06Q 10/08345; G06Q 30/0239; G06Q 30/0207
See application file for complete search history.

(56) References Cited

U.S. PATENT DOCUMENTS 7,912,748 B1    3/2011  Rosenberg et al.
7,996,331 B1 *  8/2011  Solanki .................. G06Q 10/04
                                                    705/400

(Continued)

FOREIGN PATENT DOCUMENTS

CN    110309968 A  * 10/2019
JP    2021082014 A *  5/2021

OTHER PUBLICATIONS

Joseph, "A hybrid deep learning framework with CNN and Bi-directional LSTM for store item demand forecasting," made available online on Sep. 13, 2022, https://www.sciencedirect.com/science/article/pii/S0045790622005754?via%3Dihub and https://doi.org/10.1016/j.compeleceng.2022.108358 (Year: 2022).*

(Continued)

*Primary Examiner* — Jeff Zimmerman
*Assistant Examiner* — Matthew Parker Goodman
(74) *Attorney, Agent, or Firm* — Merchant & Gould P.C.

(57) ABSTRACT

In general, this disclosure is directed to determining an optimal markup policy for a third party delivery service. One aspect is a method for dynamically optimizing prices by a third party delivery service, the method comprising retrieving item information for a plurality of items including pricing data, the plurality of items being sold by a retailer and available for delivery by the third party delivery service, simulating a plurality of markup policies with a neural network trained to identify non-linear price-demand relationships between the plurality of items, determining, as part of simulating the plurality of markup policies, an optimal markup policy for the third party delivery service, and providing a user interface to a customer computing device, the user interface displaying at least some of the plurality of items for delivery by the third party delivery service with prices reflecting the optimal markup policy.

18 Claims, 13 Drawing Sheets

(51) Int. Cl.
  *G06Q 10/04*      (2023.01)
  *G06Q 10/0834*    (2023.01)
  *G06Q 30/0601*    (2023.01)

(56) References Cited

U.S. PATENT DOCUMENTS

| | | | |
|---|---|---|---|
| 8,386,285 | B2 | 2/2013 | Chen et al. |
| 10,430,812 | B2 | 10/2019 | Wang et al. |
| 10,832,268 | B2 | 11/2020 | Binkiewicz et al. |
| 2018/0285787 | A1* | 10/2018 | Ito .................. G06F 17/11 |
| 2019/0385055 | A1* | 12/2019 | Sim .................. G06N 3/045 |
| 2020/0242644 | A1* | 7/2020 | Omer .................. G06Q 10/04 |
| 2021/0019694 | A1* | 1/2021 | Dhesi .................. G06Q 10/087 |
| 2021/0406978 | A1* | 12/2021 | Subramanian .......... G06N 3/08 |
| 2022/0012595 | A1* | 1/2022 | David .................. G06N 3/045 |
| 2022/0101397 | A1* | 3/2022 | Jung .................. G06Q 20/326 |
| 2022/0358436 | A1* | 11/2022 | Vakhutinsky ........ G06Q 10/0637 |
| 2022/0394337 | A1* | 12/2022 | Vagharshakian .... G06Q 30/0201 |
| 2023/0394512 | A1* | 12/2023 | Kumar ................ G06Q 30/0202 |
| 2024/0193628 | A1* | 6/2024 | Chen .................. G06Q 50/12 |

OTHER PUBLICATIONS

Brownlee, "How to use an Encoder-Decoder LSTM to Echo Sequences of Random Integers," Aug. 27, 2020, https://machinelearningmastery.com/how-to-use-an-encoder-decoder-lstm-to-echo-sequences-of-random-integers/ (Year: 2020).*

Lloret, "Two deep learning approaches to forecasting disaggregated freight flow: convolutional and encoder-decoder recurrent," Mar. 20, 2021 https://doi.org/10.1007/s00500-021-05678-5 (Year: 2021).*

Ito, Shinji, and Ryohei Fujimaki. "Large-scale price optimization via network flow." Advances in Neural Information Processing Systems 29 (2016).

Ito, Shinji, and Ryohei Fujimaki. "Optimization beyond prediction: Prescriptive price optimization." Proceedings of the 23rd ACM SIGKDD international conference on knowledge discovery and data mining (2017).

Shaohui Ma, Roobert Fildes, "A retail store SKU promotions optimization model for category multi-period profit maximization" European Journal of Operational Research 260 (2017).

* cited by examiner

700

| Parent 1 | | | | | Parent 2 | | | |
|---|---|---|---|---|---|---|---|---|
| X | Y | Z | K | | J | I | L | M |

| X | I | L | K | Child A |
|---|---|---|---|---|

| J | Y | Z | M | Child B |
|---|---|---|---|---|

| X | I | L | K | Child A

Mutation ↓

| X | I | B | K | Child A

| J | Y | Z | M | Child B

No Mutation ↓

| J | Y | Z | M | Child B

| U | V | W | N | Child C

Mutation ↓

| U | D | W | Q | Child C

FIG. 8

| Index | 0 Markup Actual | 1 Markup Optimized | 2 Volume Actual | 3 Volume Predicted | 4 Volume Optimized | 5 Volume @1.3MU | 6 Volume @1.0MU | 7 GMV Actual | 8 GMV Predicted | 9 GMV Optimized | 10 GMV @1.3MU | 11 GMV @1.0MU |
|---|---|---|---|---|---|---|---|---|---|---|---|---|
| Gala Apple | 1.1125 | 1 | 2 | 6 | 5 | 7 | 5 | 1.78 | 5.34 | 4 | 7.28 | 4 |
| Lettuce Romaine | 1.09746 | 1.15 | 3 | 2 | 3 | 2 | 3 | 7.77 | 5.18 | 8.142 | 6.136 | 7.00 |
| Yellow Squash | 1.1125 | 1.3 | 1 | 2 | 3 | 2 | 3 | 0.89 | 1.78 | 3.12 | 2.08 | 2.4 |
| Zucchini Squash | 1.1125 | 1.1 | 7 | 12 | 13 | 10 | 13 | 6.23 | 10.68 | 11.44 | 10.4 | 10.4 |
| Roma Tomato | 1.32432 | 1.05 | 24 | 22 | 24 | 22 | 23 | 11.76 | 10.78 | 9.324 | 10.582 | 8.51 |
| Celery | 1.20134 | 1.1 | 10 | 8 | 9 | 8 | 8 | 17.9 | 14.32 | 14.751 | 15.496 | 11.92 |
| Melon Watermelon Seedless | 1.08761 | 1.05 | 0 | 0 | 0 | 0 | 0 | 0 | 0 | 0 | 0 | 0 |
| Wonderful Halos Mandarins | 1.18773 | 1.25 | 6.66667 | 5 | 6 | 6 | 5 | 63.266 | 47.45 | 59.925 | 62.322 | 39395 |
| Green Seedless Grapes | 1.08451 | 1.1 | 5.33333 | 11 | 12 | 12 | 11 | 28.746 | 59.29 | 65.604 | 77.532 | 54.67 |
| Melons Honeydew | 1.2005 | 1.1 | 0 | 1 | 1 | 1 | 1 | 0 | 4.79 | 4.389 | 5.187 | 3.99 |
| Cauliflower | 1.2-761 | 1.3 | 5 | 4 | 4 | 3 | 4 | 17.45 | 13.96 | 15.028 | 11.271 | 11.56 |
| Apple Pink Cripps Pink Lady | 1.1125 | 1.2 | 0 | 8 | 8 | 8 | 8 | 0 | 7.12 | 7.68 | 8.32 | 6.4 |
| Cantaloupe | 1.20101 | 1.2 | 1 | 4 | 5 | 4 | 5 | 2.39 | 9.56 | 11.94 | 10.348 | 9.95 |

FIG. 11

MARKUP OPTIMIZATION

BACKGROUND

Vendors typically strive to price items at levels which optimize sales revenue. Vendors may consider several factors to determine an optimal prices for items, including marginal cost, marginal revenue, supply, and price elasticity of demand. In many instances, vendors assume a linear demand when forecasting the price elasticity of demand of an item. For example, the price elasticity of demand can be forecasted using a linear regression model. In some instances, a mixed-integer linear programming (MILP) or quadradic programming (QP) solver is used for optimizing pricing for a plurality of items.

Third party delivery service providers typically operate as an add on service for delivering items from a vendor to a customer. Some third party delivery service providers interface with a plurality of different vendors. Third party delivery service providers generate revenue through delivery fees, subscription fees, and/or receiving tips.

SUMMARY

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

In general, this disclosure is directed to determining an optimal markup policy for a third party delivery service (or another add on service). In some embodiments, a neural network is used to identify non-linear price-demand relationships.

One aspect is a method for dynamically optimizing prices by a third party delivery service, the method comprising retrieving item information for a plurality of items including pricing data, the plurality of items being sold by a retailer and available for delivery by the third party delivery service, simulating a plurality of markup policies with a neural network trained to identify non-linear price-demand relationships between the plurality of items, determining, as part of simulating the plurality of markup policies, an optimal markup policy for the third party delivery service, and providing a user interface to a customer computing device, the user interface displaying at least some of the plurality of items for delivery by the third party delivery service with prices reflecting the optimal markup policy.

Another aspect is a third party delivery service system comprising at least one processing device, at least one memory device storing instructions which, when executed by the at least one processing device, cause the third party delivery service system to retrieve item information for a plurality of items including pricing data, the plurality of items being sold by a retailer and available for delivery by a third party delivery service associated with the third party delivery service system, simulate a plurality of markup policies with a neural network trained to identify non-linear price-demand relationships between the plurality of items, determine, as part of simulating the plurality of markup policies, an optimal markup policy for the third party delivery service, and provide a user interface to a customer computing device, the user interface displaying at least some of the plurality of items for delivery by the third party delivery service with prices reflecting the optimal markup policy.

Yet another aspect is a non-transitory computer-readable medium comprising computer-executable instructions which, when executed by a computing system cause the computing system to retrieve item information for a plurality of items including pricing data, the plurality of items being sold by a retailer and available for delivery by a third party delivery service, simulate a plurality of markup policies with a neural network trained to identify non-linear price-demand relationships between the plurality of items, determine, as part of simulating the plurality of markup policies, an optimal markup policy for the third party delivery service, and provide a user interface to a customer computing device, the user interface displaying at least some of the plurality of items for delivery by the third party delivery service with prices reflecting the optimal markup policy.

BRIEF DESCRIPTION OF THE DRAWINGS

The accompanying drawings, which are incorporated in and constitute a part of the description, illustrate several aspects of the present disclosure. A brief description of the drawings is as follows:

FIG. 7 is an example illustration for the crossover operation shown in FIG. 6.

FIG. 8 is an example illustration for a mutation operation shown in FIG. 6.

FIG. 11 illustrates an example chart comparing different markup policies.

DETAILED DESCRIPTION

Figure 1:
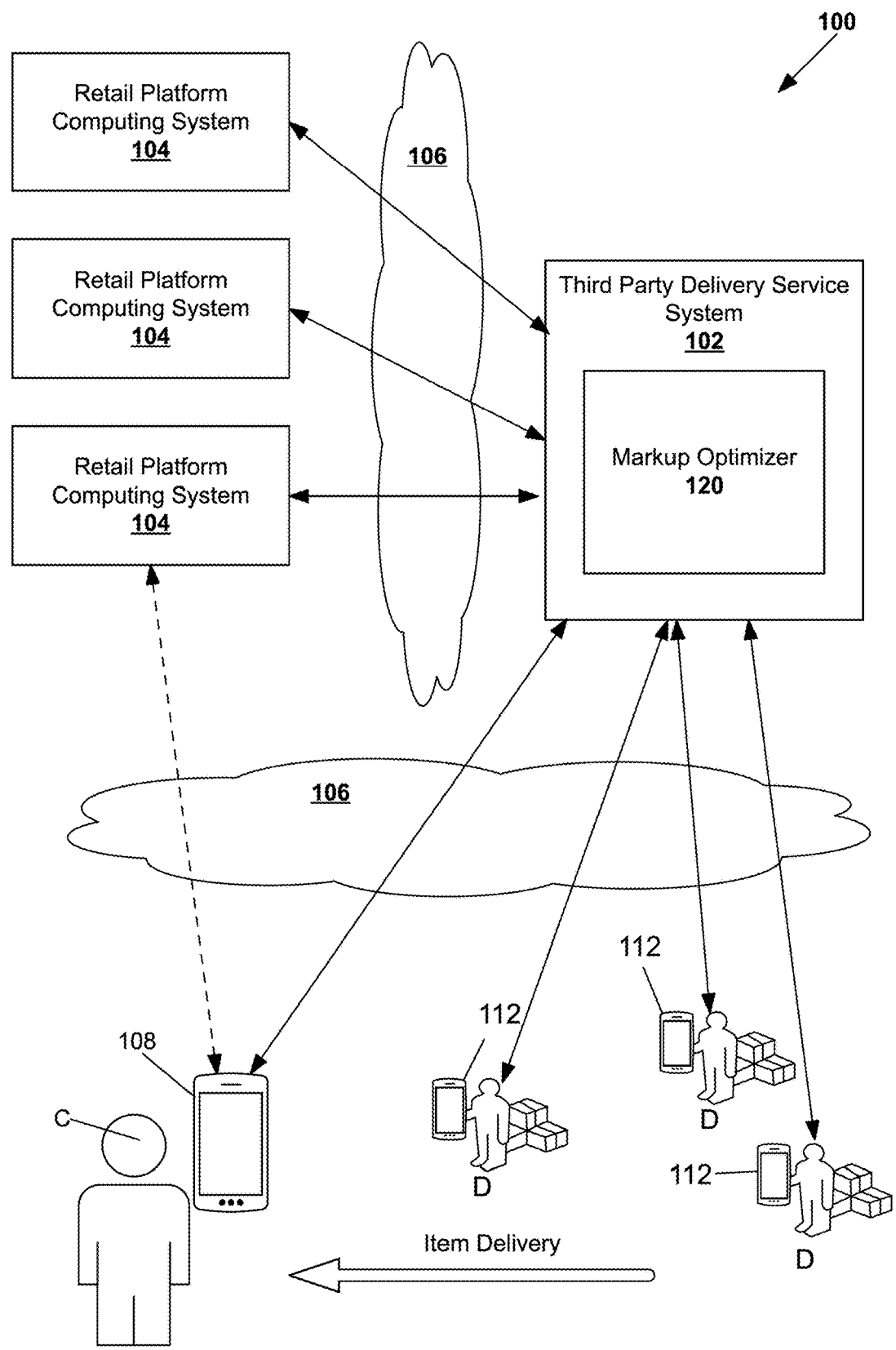
FIG. 1 illustrates an example environment for a third party delivery service system with a markup optimizer.

Reference will now be made in detail to exemplary aspects of the present disclosure that are illustrated in the accompanying drawings. Wherever possible, the same reference numbers will be used throughout the drawings to refer to the same or like parts.

In general, this disclosure is directed to determining an optimal markup policy for a third party delivery service. In many embodiments, the third party delivery service is an add on service for a retailer, where the retailer may include a plurality of physical stores and/or an e-commerce platform. In some examples, the third party delivery service applies a markup policy to items delivered by the third party delivery service as a manner of generating revenue. For example, the third party retail service may markup a price of one or more items as compared to the price set by the retailer for the one or more items.

In some embodiments, the optimal markup policy includes adjusting prices higher and/or lower than the price the product is sold at the retailer. For example, the optimal markup policy may discount the prices on some items as a manner of driving greater sales in other items to achieve maximum revenue. In some embodiments, the markup policy is applied in circumstances where the third party delivery service is used to deliver items from a retailer and considers customer behavior when interacting with an add on service, impacts of delivery fees, and/or impacts of subscription fees. The third party delivery service may be configured to integrate with a plurality of different retail platforms.

In some embodiments, the optimal markup policy uses a multi-item price-volume model to capture nonlinear price to demand relationships between a plurality of items. For example, the multi-item price-volume model 360 illustrated and described in reference to FIGS. 4 and 5. In some embodiments, the multi-item price-volume model is a neural network trained on historical transaction data for the retailer and/or the third party delivery service. In some embodiments, the optimal markup policy receives a markup policy for a plurality of items and predicts sales volume for the plurality of items based on the markup policy. In some embodiments, revenue and/or profit is derived from predicted sales volumes for the plurality of items. In some embodiments, the neural network is a multi-level deep neural network (DNN). In some embodiments, the DNN includes an input layer, pre-trained effects layer(s), and a multi-item price-volume predictor layer. In some embodiments, the multi-item price volume predictor layer identifies nonlinear-elasticity relationships for the plurality of items. In some embodiments, the multi-item price volume predictor layer identifies cross dependencies between the pricing of various items in the plurality of items. For example, cross elasticities, complementary properties between items, substitutability properties between items, etc. In some embodiments, the predictions are derived from a cost array and a markup array for the plurality of items.

In some embodiments, the multi-item price-volume model operates on a plurality of items and captures circumstances where changes in the price of one item effects price simulated volume changes in other items. For example, the multi-item price-volume model can predict the impact of changing the price of a banana on other items such as apples, strawberries, red pepper, raspberries, tuna, etc.

In some embodiments, the multi-item price-volume model also outputs model parameters to a markup optimization engine. The markup optimization engine runs multiple passes (e.g., simulations) through the multi-item price-volume model with shuffled markup policies using an evolutionary optimization algorithms to find optimal solutions. The genetic algorithms improve the efficiency as part of the search for the optimal markup solution.

In some embodiments, the retailer and/or the third party delivery service can provide item-specific constraints to the genetic algorithm, to limit the amount of shuffling between generations, or to prevent certain items from being shuffled. In some embodiments, the multi-item price volume model considers the cross-elasticity demand impact of unconstrained item prices on demand for the constrained items. In some embodiments, markup for certain items may be constrained due to legal or regulatory considerations.

As discussed above, in some embodiments, the markup policy is dynamically optimized using non-linear price-demand elasticities, including cross elasticities and other cross dependencies over a large set of products. In some embodiments, the markup policy is optimized across a variety of retailers or a variety of physical stores of a retailer. Improvements include, reduced computational costs compared to optimization solutions using assumed linear demand and mixed-integer linear programming (MILP) or quadradic programing (QP) solvers. Additionally, advantages include improved accuracy because the markup policy is dynamically optimized without assuming linear price-demand relationships. These advantages in accuracy and reduced computational costs allow for dynamic optimization of the markup policy in near real time based on identified price-demand adaptations. Additionally, the modeling is highly scalable and can process large sets of items simultaneously. Additionally, the modeling approach describe herein can further be used to predict future price-demand fluctuations and provide suggestions to customers based on those predictions.

In some embodiments, differences between in-store customer behavior and third party delivery service customer behavior is learned as part of the multi-item price-volume model. For example, an in-store customer is more likely to select a substitute good based on pricing rather than leaving the store, whereas an online shopper using the third party delivery service may be more likely to switch providers to purchase the desired product at a lower price rather than select a substitute good. However, a customer with a subscription service may be unlikely to use another service outside of the subscription. In some examples, online shopping providers provider greater pricing transparency and allow customers to efficiently compare pricing (including between retailers within a third party delivery service application and between different add-on service providers). In some embodiments, the third party delivery service may consider agent availability (e.g., delivery user availability) to balance with customer demand. Using transaction data of the third party retailer allows the multi-item price-volume model to learn pricing impacts in the third party delivery service context, including but not limited to the considerations outlined above. In some embodiments, transaction data from the third party delivery service is merged with transaction data form the retailer to further train the neural network to determine nonlinear price to demand relationships for a plurality of items, including cross dependencies among the plurality of items.

In some embodiments, disclosed herein the third party delivery service is scalable to serve customers of a large number of retailers. In some embodiments, the third party delivery service offers a service to provide delivery of an order within hours or minutes of the order being placed by a customer user.

FIG. 1 illustrates an example environment 100 for a third party delivery service system with a markup optimizer 120. The environment 100 operates to delivery items sold by one or more retailers to customer users (e.g., the customer user C), where delivery can be performed by delivery users D associated with a third party delivery service provider. The environment includes at least one customer user computing device 108 operable to access the third party delivery service system 102. The third party delivery service system 102 provides web based portals accessible by the customer user computing device 108 to browse available items for purchase from one or more retailers each associated with a corresponding retail platform computing system 104. The third party delivery service system 102 also operates to provide a web portal to delivery user computing devices 112 to allow the delivery users D to deliver items purchased by the customer user C. The third party delivery service system 102, retail platform computing system(s) 104, customer user computing device 108, and delivery user device(s) 112 may be in digital communication via a network 106.

The third party delivery service system 102 is operated by a third party delivery service provider. In some embodiments, the third party delivery service provider is associated with, is owned by, or owns one or more retailers. In some embodiments, the third party delivery service provider employs or contracts delivery users D to perform deliveries from one or more retailers. In some instances, the service provider utilizes crowd-sourced delivery users D to complete deliveries based on communications (via the network 106) with the delivery user computing devices 112.

In some embodiments, the third party delivery service system 102 interfaces with the third party delivery service system 102 to provide customers with an online-shopping experience with one or more retailers. The example integration between a retail platform computing system 104 and the third party delivery service system 102 is illustrated and described in reference to FIG. 2. In some embodiments, the customer user interfaces with a retail platform which is integrated with the third party delivery service system 102.

The network 106 allows for communication between one or more computing devices in the environment 100. The network 106 can be a wired network or a wireless network such as the Internet.

After receiving order information via one of the delivery user computing devices 112, delivery users D perform deliveries. In some instances, deliveries are performed by picking up items from a physical retail location and delivering the items to a customer delivery address associated with a customer user C. The delivery user computing device 112 can be utilized to access order information, provide confirmations, communicative with customer users C, and receive confirmations and payment.

The third party delivery service system 102 includes a markup optimizer 120. The markup optimizer 120 operates to determine and apply an optimal markup policy. In some embodiments, the optimal markup policy is the policy which would generate the maximum revenue or maximum profit for the third party delivery service provider. In some embodiments, the optimal markup policy is a markup policy which meets a threshold markup requirement. In some embodiments, the markup optimizer 120 includes a neural network which is trained to identify non-linear price demand relationship for each item sold by the retailer which is deliverable by the third party delivery service. Systems and method for determining an optimal markup policy are disclosed herein.

In some embodiments, the optimal markup policy is a policy that achieves a third party delivery services goal and/or a retailer specific goal. For example, the optimal markup policy may include the policy which increases order volume for a business that is at a growth stage. In some embodiments, various objectives (e.g., predicted sales volume, predicted convergence rate, predicted new customers, etc.) are output via an output layer. The markup optimizer 120 may optimize for the various objectives by targeting multi-output targets. In some embodiments, the markup optimizer 120 simultaneously optimizes for the various objectives through identifying a shared markup policy.

Figure 2:
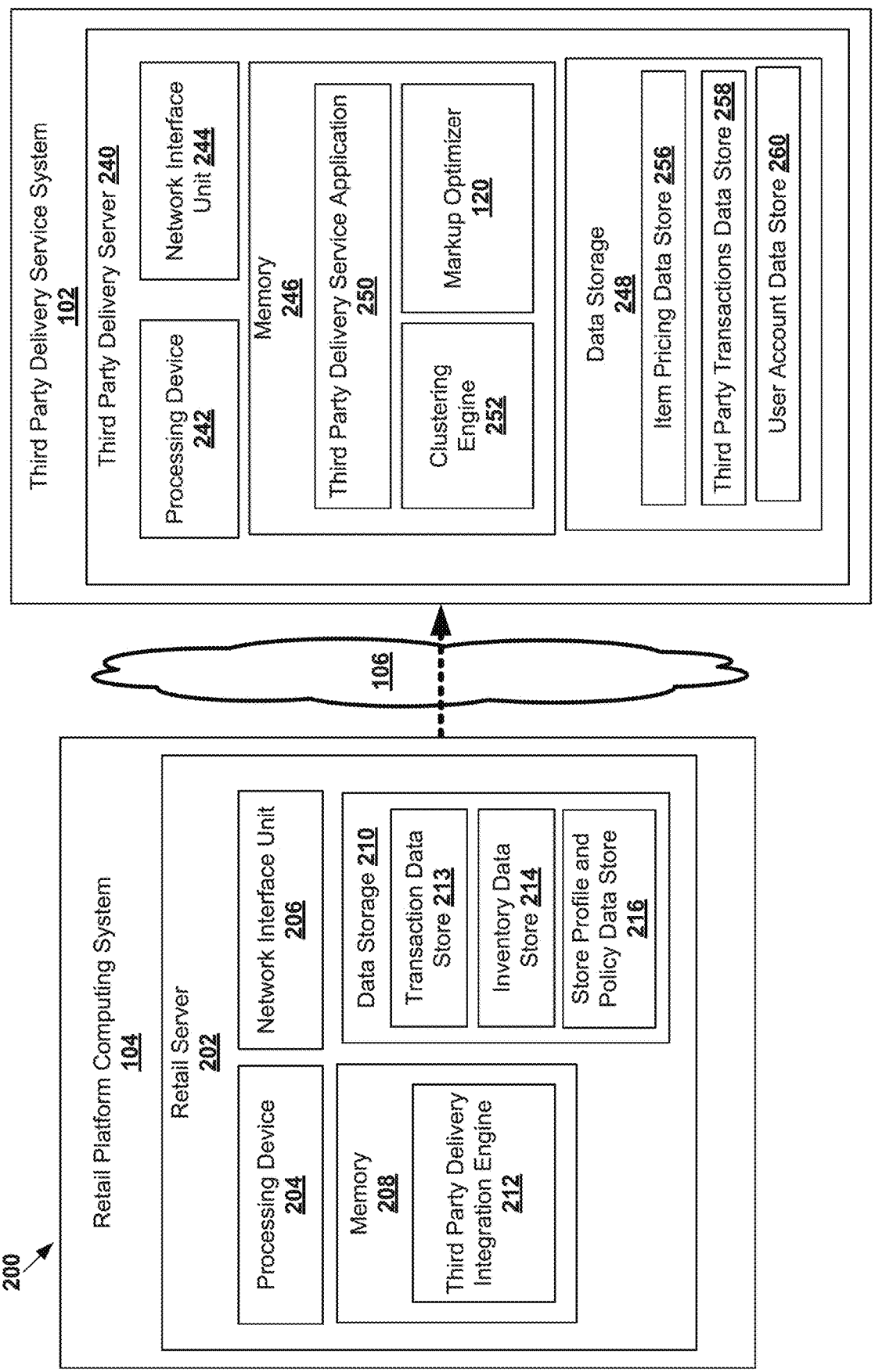
FIG. 2 illustrates another example environment for a third party delivery system with a markup optimizer.

FIG. 2 illustrates another example environment 200 for a third party delivery service system 102 with a markup optimizer 120. The environment 200 includes a retail platform computing system 104 and a third party delivery service system 102. The retail platform computing system 104 is in digital communication with the third party delivery service system 102 via the network 106.

The retail platform computing system 104 includes at least one retail server 202. The retail server 202 provides retail computing services for various retail processes including online shopping services, inventory management services, third party integration services, shipping integration service, etc.

Figure 10:
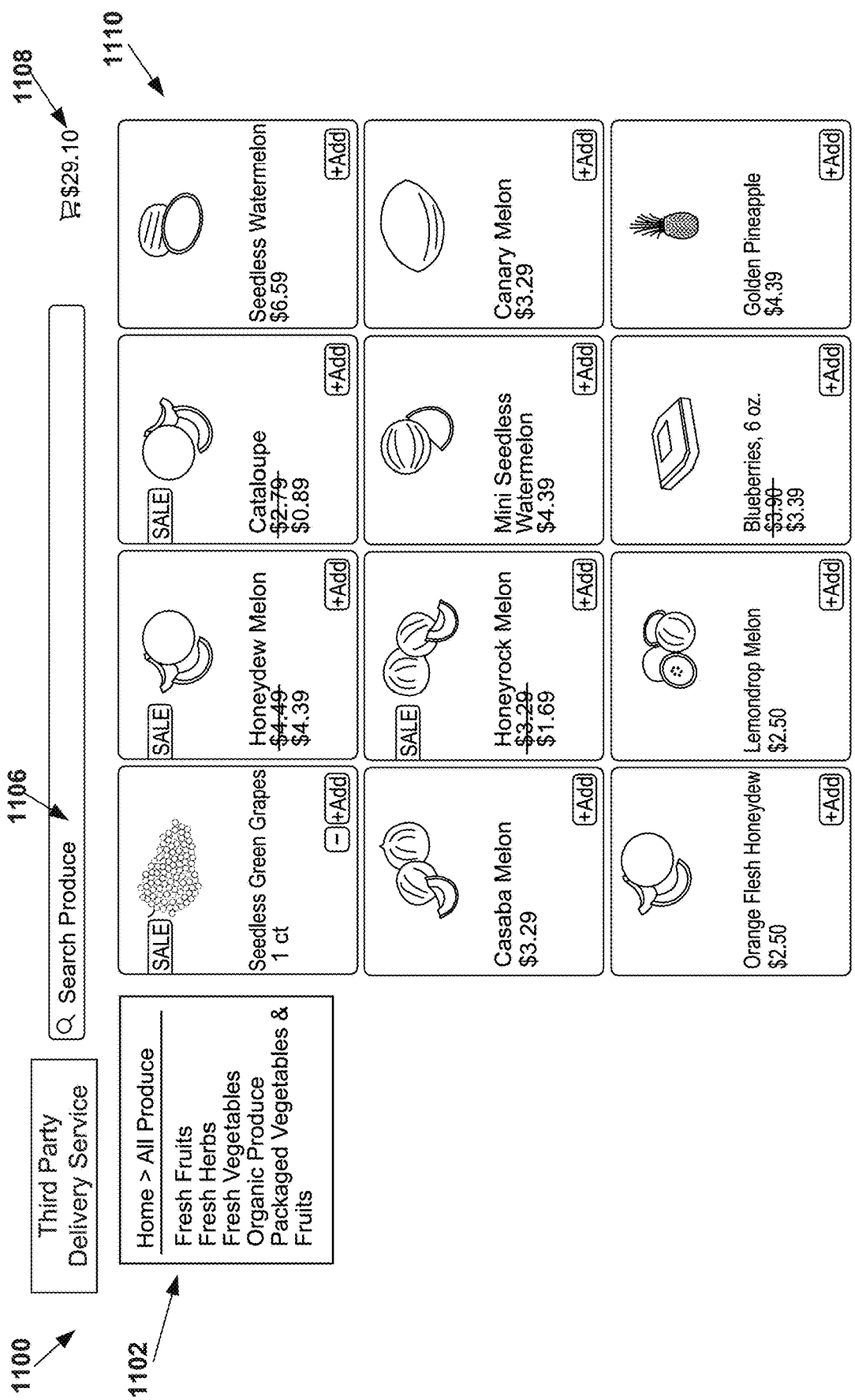
FIG. 10 illustrates an example user interface for a third party delivery service.

The retail server includes a processing device 204, a network interface unit 206, a memory 208, and data storage 210, examples of each are illustrated and described in reference to FIG. 10 (e.g., the processing device 1002, the network interface unit 1004, the memory 1008, and the data storage 1010).

The memory 208 stores instructions to execute a third party delivery integration engine 212. The third party delivery integration engine 212 interfaces with the third party delivery service system 102. In some embodiments, the third party delivery integration engine 212 includes an API which allows the third party delivery service system 102 to retrieve item information, inventory information, store information, etc.

In some embodiments, the data storage 210 provides data storage services for the retail platform computing system. The data storage 210 includes a transaction data store 213, an inventory data store 214, and a store profile and policy data store 216.

The transaction data store 213 stores transaction data for the retailer. In some embodiments, the transaction data includes when and where items are purchased. In some embodiments, the transaction data is indexed by item and store. In some embodiments, the transaction data includes transaction data for an online retail platform and/or transaction data form physical stores. In some embodiments, the transaction data is provided to the third party delivery service system 102 to train one or more models in the markup optimizer 120. In some embodiments, the model is dynamically trained as more transaction data is logged and stored at the transaction data store 213.

The inventory data store 214 stores inventory information for the retailer. In some embodiments, the inventory information is provided to the third party delivery service system 102 to allow the third party delivery service system to present stocked items to customer users as well as instruction delivery users on where to purchase items for delivery.

The store profile and policy data store 216 stores store profile information as well as policies for a specific store. For example, specific stores may have unique pricing policies based on characteristics of the store. For example, a store may have policies which are specific to an individual store, a region of the store, etc. In some embodiments, the store may have a markup policy (e.g., a maximum markup allowed to be added by third party add on services). In some embodiments, the store profile and policy data store 216 stores a policy which reflects a contract between the retailer and the third party delivery service provider.

The third party delivery service system 102 includes at least one third party delivery server 240. The third party delivery server 240 provides computing services for the third party delivery service.

The third party delivery server 240 includes a processing device 242, a network interface unit 244, a memory 246, and data storage 248, examples of each are illustrated and described in reference to FIG. 10 (e.g., the processing device 1002, the network interface unit 1004, the memory 1008, and the data storage 1010).

In some embodiments, the memory 246 stores instructions for a third party delivery service application 250, a clustering engine 252, and the markup optimizer 120.

The third party delivery service application 250 operates as a web portal for customer users and delivery users. For example, the third party delivery service can generate and provide a user interface for browsing items sold at one or more connected retailers and selecting items for delivery. In some embodiments, the third party delivery service application interfaces with delivery users computing devices to source a delivery driver for an order and provide instructions for picking up and delivery items to the customer user. The third party delivery service application 250 can also interface with the retail platform computing system 104 e.g. via an API published at the retail platform computing system 104 and/or an API published at the third party delivery service system 102.

In some embodiments, the third party delivery service system includes a clustering engine 252. The clustering engine 252 clusters items into groups prior to analyzing the items with the markup optimizer 120. In some embodiments, items are clustered based on substitutability, cross-elasticity, time of day the item is typica purchased, day of the week the item is purchased, category of item, price range, or any combination thereof. In some embodiments, clustering items reduces the computational costs and speed of the markup optimizer because the clustering engine reduces the number of items processed together by the markup optimizer.

In some embodiments, the clustering engine 252 may cluster items by brand, type, and size. Combinations thereof are possible as well. For example, the clustering engine 252 may groups a plurality of flavors of yogurts of a same brand and a same size together. In some embodiments, the markup optimizer operates on an SKU or other item level.

The markup optimizer 120 operates to determine any optimal markup policy for a plurality of items. In some embodiments, the markup optimizer 120 includes a model trained on transaction data including data stored at the transaction data store 213 and/or the third party transaction data store 258. In some embodiments, the model is dynamically trained as markup policies are implemented and based on the observed demand impacts of the implemented markup policies. An example system flow diagram illustrating a process for applying the markup policy to identify an optimized markup policy 372 is illustrated and described in reference to FIG. 4. Example implementations for the markup optimization engine are disclosed herein.

In some embodiments, the data storage 248 includes an item pricing data store 256, a third party transaction data store 258, and a user account data store 260.

The item pricing data store 256 stores pricing data for the third party delivery service application 250. In some embodiments, the third party delivery service application 250 generates a user interface that is provided to customer users. The user interface is generated by pulling current pricing information from the item pricing data store. In some embodiments, the optimal markup policy is applied to or is stored in the item pricing data store. The optimal markup policy is dynamically applied to the pricing data stored in the item pricing data store 256 such that the third party delivery service application 250 automatically pulls the current optimal markup policy from the item pricing data store when generating a shopping user interface.

The third party transaction data store 258 stores transaction data for the third party delivery service provider. For example, the third party transaction data store 258 stores orders made with the third party delivery service, including pricing data for the items delivered by the third party delivery service provider. In some embodiments, the third party transaction data store 258 stores a volume matrix indicating a number of each item sold over a given time period at a given price. In some embodiments, the third party transaction data store 258 is used to train a model to identify non-linear price-demand relationships for a plurality of items. For example, the inputs to a multi-time price demand model (e.g., as described in FIG. 5) may be derived from the transaction data as well as observed changes in sales volume and/or revenue to train a model to learn the impact of pricing for a plurality of items on sales volume and/or revenue. In some embodiments, some or all of the data stored in the third party transaction data store 258 is used to train a model to identify cross-dependencies between products and the impact of price on the demand for cross dependent items.

The user account data store 260 stores customer user information and delivery user information. In some embodiments, customer users create accounts with preferences, delivery location data, order histories, etc. In some embodiments, delivery users create accounts with availability information, location information, vehicle information (e.g., to determine which items can be shipped by the delivery user), etc.

Although FIG. 2 shows a single retail server 202 and a single third party delivery server 240, many embodiments include multiple retail servers and/or multiple third party delivery servers. In some of these embodiments, each of the multiple servers may be identical or similar and may provide similar functionality (e.g., to provide greater capacity and redundancy, or to provide services from multiple geographic locations). Alternatively, in these embodiments, some of the multiple servers may perform specialized functions to provide specialized services (e.g., data storage services, machine learning services, etc.). Various combinations thereof are possible as well.

Figure 3:
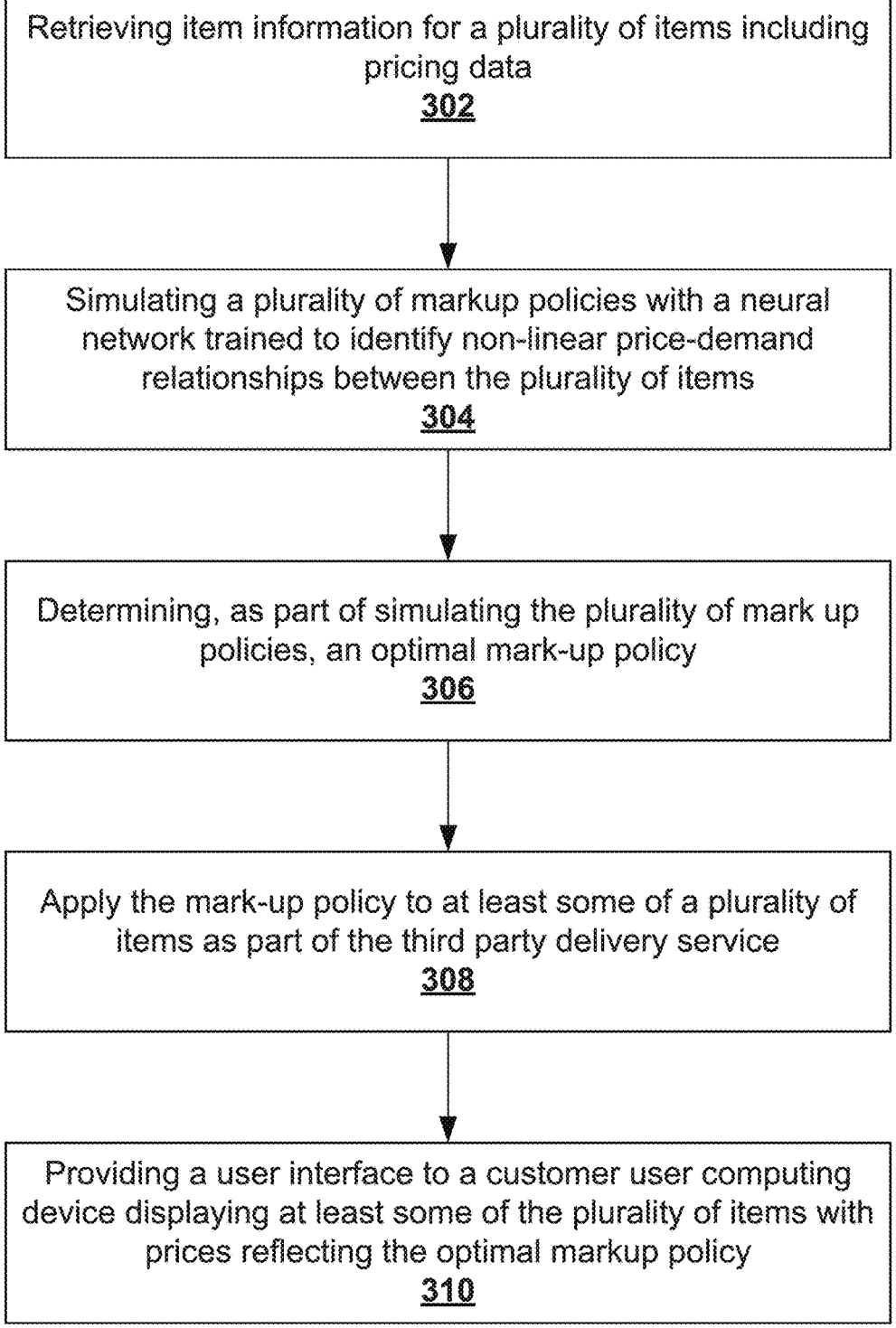
FIG. 3 illustrates an example method for determining and providing an optimized markup policy.

FIG. 3 illustrates an example method 300 for determining and providing an optimized markup policy. In some embodiments, the method is executed at the third party delivery service system 102 as part of the markup optimizer 120 (e.g., as shown in FIGS. 1 and 2). The method 300 includes the operations 302, 304, 306, and 308.

The operation 302 retrieves item information for a plurality of items including pricing data. In some embodiments, the pricing data includes a price each of the plurality of items is listed at for the retailer. In some embodiments, the pricing data is specific to a physical retail store of the retailer. In some embodiments, the pricing data is specific to a specific date or range of dates. In some embodiments, a cost array for the plurality of items is derived from the pricing data. The cost array including the cost for each item included in the cost array. In some embodiments, the item information further includes item characteristics, metadata, features, historical pricing information, etc.

The operation 304 simulates a plurality of markup policies with a neural network trained to identify non-linear price-demand relationships between the plurality of items. In some embodiments, simulating a plurality of markup policies includes testing the plurality of markup policies as part of a search for the optimal markup policy. In some embodiments, an evolutionary algorithm is used to search for the optimal markup policy. A system flow diagram illustrating an example simulation process 350 for determining an optimal markup policy is illustrated and described in reference to FIG. 4. An example architecture for the neural network trained to identify non-linear price demand relationships is illustrated and described in reference to FIG. 5.

The operation 306 determines, as part of simulating the plurality of markup policies, an optimal mark-up policy. In some embodiments, the optimal mark-up policy which results in the highest revenue, profit, sales volume, and/or other related metric, is selected. In some embodiments, the markup policy which is closest to a goal markup value is selected. In some embodiments, a set number of simulations are run and the optimal markup policy is determined by analyzing the simulation runs.

Figure 6:
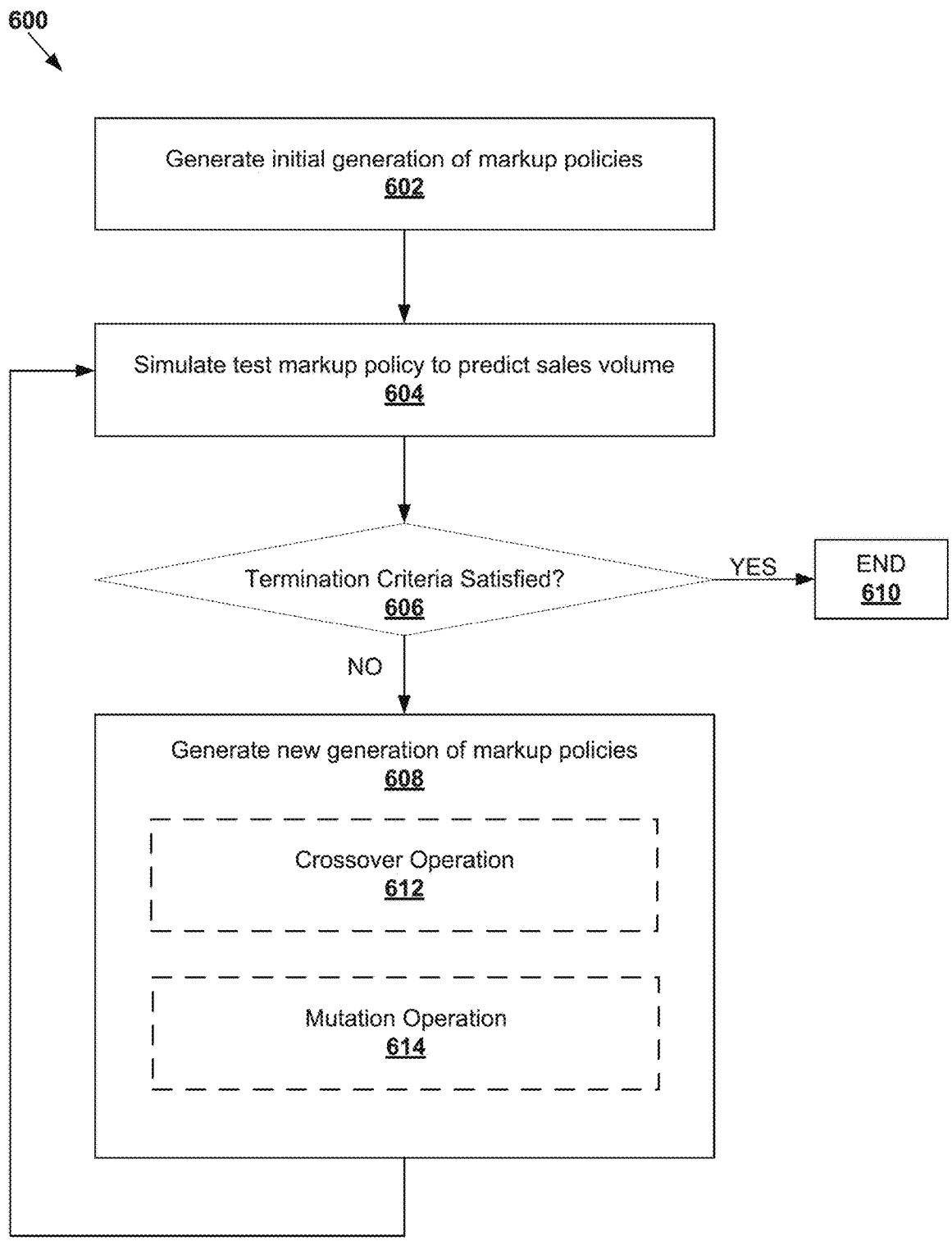
FIG. 6 illustrates an example method for simulating test markup policies to identify an optimized markup policy.

An example method for simulating a plurality of markup policies to determine an optimal markup policy is illustrated and described in reference to FIG. 6.

The operation 308 applies the mark-up policy to at least some of a plurality of items provided as part of the third party delivery service. In some embodiments, the markup policy is applied across all of the plurality of items. In some embodiments, the markup policy is applied to a subset of items. In some embodiments, the markup policy includes discounts on some items, where the third party delivery service takes a loss to drive greater sales on other items.

The operation 310 provides a user interface to a customer user computing device displaying at least some of the plurality of items with prices reflecting the optimal markup policy. In some embodiments, in response to receiving a request to view a shopping page for a retailer, the third party delivery service system generates and provides a user interface for to purchase items for delivery including pricing information which reflects the optimal markup policy.

Figure 4:
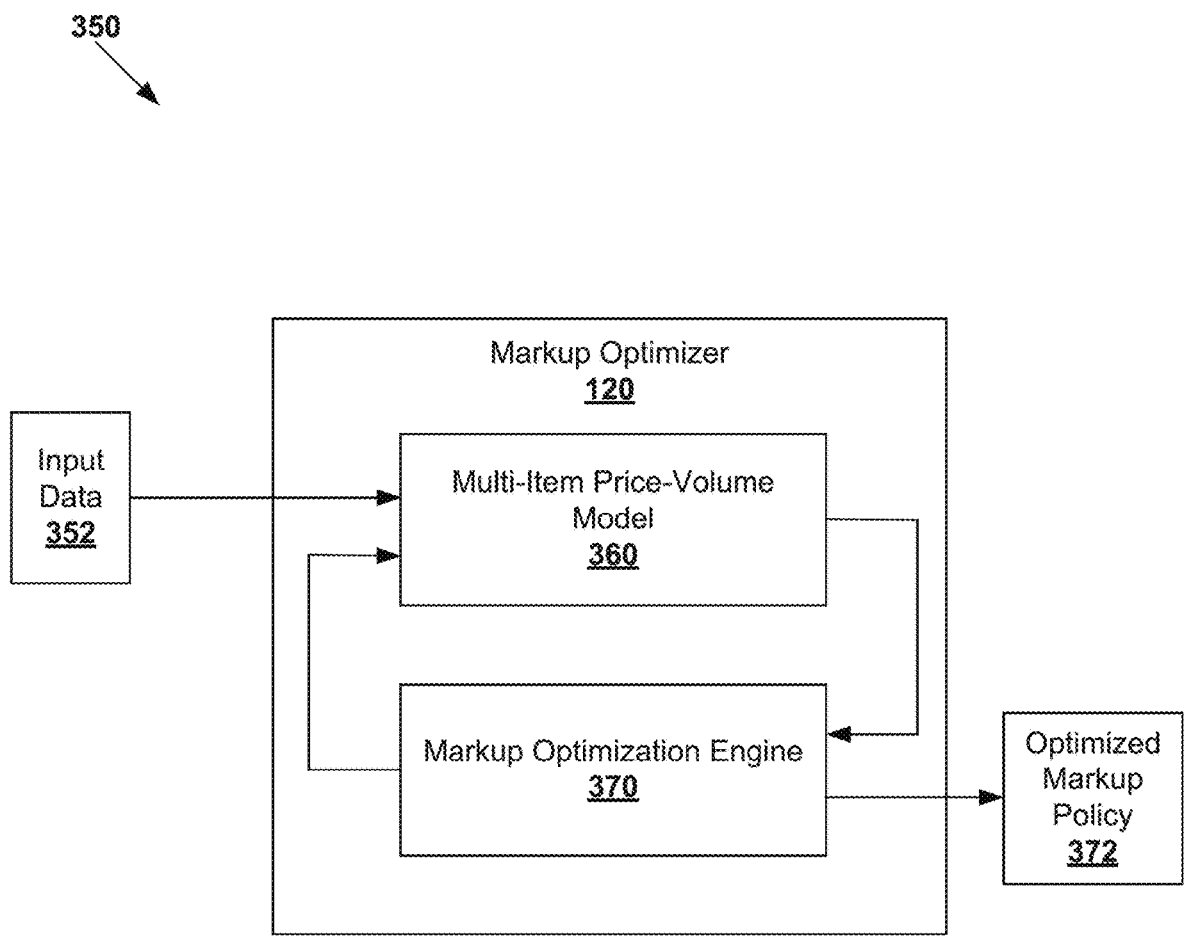
FIG. 4 illustrates a system flow diagram illustrating a simulation process using the markup optimizer.

FIG. 4 illustrates a system flow diagram illustrating a simulation process 350 using the markup optimizer. The markup optimizer receives input data 352 and outputs an optimized markup policy 372. The markup optimizer includes a multi-item price-volume model 360 and a markup optimization engine 370.

The input data 352 includes input features which are provided to the markup optimizer 120. In some embodiments, the input data is pre-processed by a clustering engine to group items into relevant groups for modeling price-demand impacts. In some embodiments, the input data includes temporals inputs (e.g. date), exogenous inputs (e.g., a difficult to predict event, such as COVID), a store indicator (indicating one or more stores, where the markup policy will be applied), a cost array (defining the price for the plurality of items, e.g., the baseline cost to the third party delivery service), etc. Inputs can include combinations thereof as well as other item, store, or customer features. In some embodiments, the clustering is based on substitutability of items, cross-elasticity between items, times of day the item is purchased, days of the week the items are purchased, category of item, price range of item, or any combination thereof. In some embodiments, the items are not clustered. In some embodiments, the input data includes features form a plurality of different stores and/or from a plurality of different retailers.

The multi-item price-volume model 360 predicts the impact of a markup policy on sales volume. In some embodiments, impact on revenue is derived from the predicted sales volume. In some embodiments, the multi-item price-volume model 360 is trained to identify non-linear price-demand relationships and apply the identified relationships to predict sales volumes for a plurality of items. In some embodiments, the multi-item price-volume model 360 identifies cross-elasticity effects between the plurality of items. In some embodiments, the multi-item price-volume model 360 simultaneously applies a test markup policy across the plurality of items to determine predictions which consider cross-dependencies between items. An example multi-item price-volume model 360 is illustrated and described in reference to FIG. 5.

In some embodiments, the multi-item price-volume model 360 includes a deep neural network architecture. The deep neural network can be trained on historical transaction data to learn cross-elasticities in high-dimensional spaces (e.g., a large number of items with different levels of relationships/cross-dependencies). In some embodiments, the multi-item price-volume model 360 uses additive model.

The markup optimization engine 370 operates to identify the optimized markup policy 372. In some embodiments, the markup optimization engine 370 drives a plurality of simulations, through the multi-item price-volume model 360 and analyzes the results of the solutions. For example, the markup optimization engine 370 can generate and provide a test markup policy to the multi-item price-volume model 360 to predict changes in revenue caused by the markup policy. Based on these results, the markup optimization engine 370 can generate a new test markup policy to simulate using the multi-item price-volume model 360. In some embodiments, this process continues until a termination condition is met. For example, after a set number of iterations are completed without improvement in revenue or after a certain number of interactions.

In some embodiments, the markup optimization engine 370 uses a genetic algorithm to search for the optimized markup policy 372. For example, the search space for the optimized markup policy 372 given a large set of items is large, even with bounds and discrete steps for the markup amount. A genetic algorithm can be used to solving the optimization problems based on repeatedly modifying the markup policy over several generations. The evolution moves toward an optimal solution. In some embodiments this process can solve search problems more efficiently in the NP-Complete space (e.g. better than quadratic programming) and also in the NP-hard types. In some embodiments, using genetic algorithms allows the solution to scale to large number of products. An example method 600 for simulating a plurality of markup policies with the markup optimizer 120 is illustrated and described in reference to FIG. 6.

In some embodiments, the markup optimizer 120 is configured to include increased sensitivity to pricing changes based on delivery user availably and third party delivery service customer behavior. In some embodiments, the markup optimizer 120 is configured to make predictions at a high frequency and low-levels of granularity (e.g., monthly, daily, hourly, and/or in real time). In some embodiments, the markup optimizer 120 scalable to operate on a large number of retailers and/or products. In some embodiments, the markup optimizer 120 includes a single model for a plurality of retailers, stores, products, time windows, etc. In some embodiments, the markup optimizer 120 is multi-dimensional to learn product interdependence.

Figure 5:
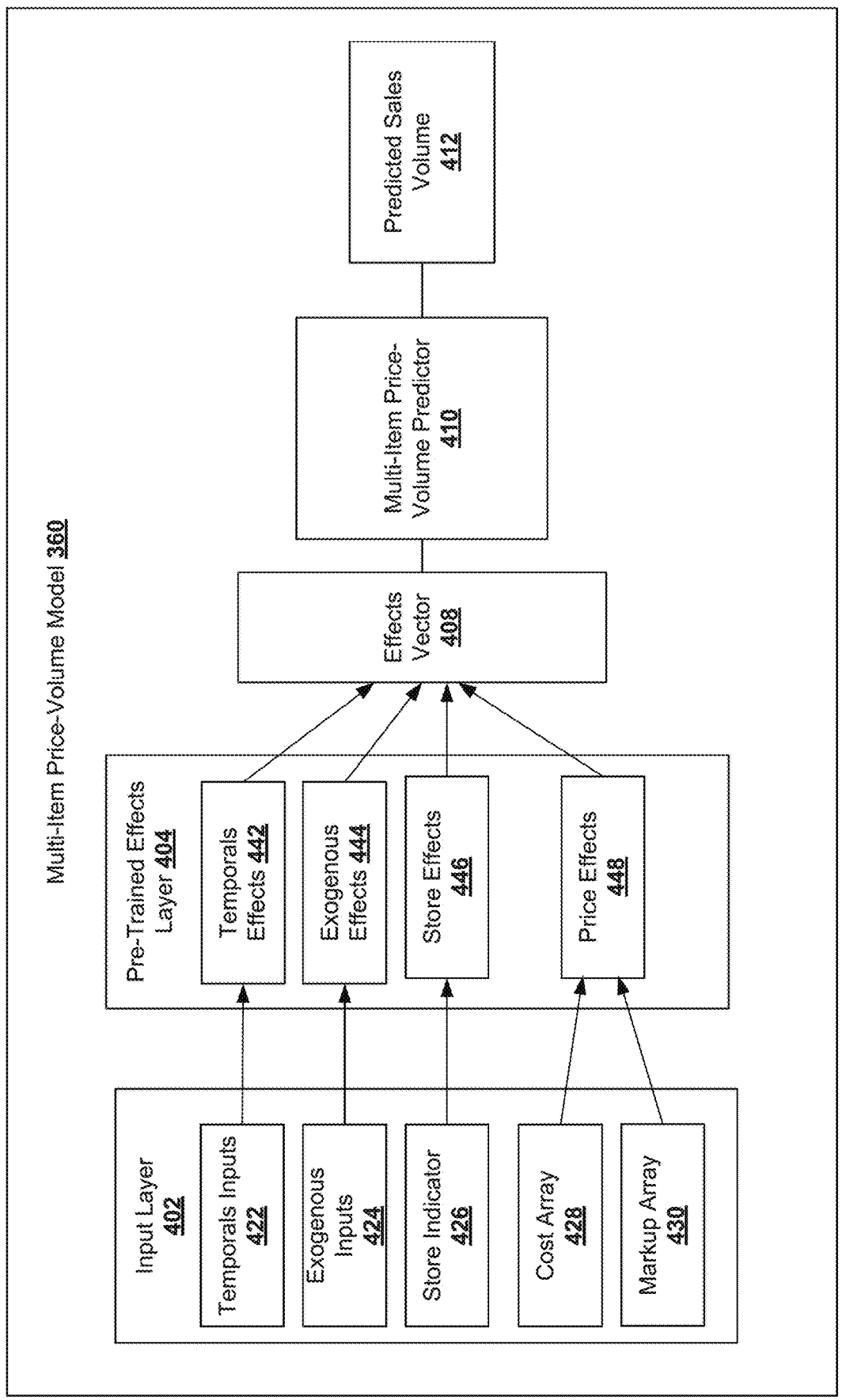
FIG. 5 illustrates an example multi-item price-volume model that predicts sales volume for a plurality of items with a markup policy.

FIG. 5 illustrates an example multi-item price-volume model usable for predicting sales volume for a plurality of items with a given markup policy. The multi-item price-volume model 360 includes an input layer 402 which provides data to a pre-trained effects layer 404 to generate an effects vector 408. The effects vector 408 is provided to the multi-item price-volume predictor 410 which predicts sales volume for each of a plurality of items.

In some embodiments, the input layer 402 includes temporals inputs 422, exogenous inputs 424, store indicator 426, cost array 428, markup array 430. Some embodiments use different combinations thereof as well as other features related to items, stores, and/or customers.

In some embodiments, the temporals inputs 422 includes a date (e.g., a single day of the year). In some embodiments, the date is encoded into a single vector and/or variable. In some embodiments, the temporals inputs 422 further includes a single hour. In some embodiments, the temporals inputs include a range of dates such as, a week, a month, a season etc. The temporals inputs 422 may further include a variable or vector defining specific holidays. In some embodiments, the temporals inputs 422 are a single variable. In some embodiments, the temporal inputs includes a single vectors with embeddings defining different variables. For example, variables for year, week, day, holidays, or any combination thereof, can embedded into a single vector. Advantages of embedding temporals into a single vector include reducing computation costs (processing costs and/or storage costs) and increased scalability. In some embodiments, the multi-item price-volume model 360 does not receive temporals inputs 422 or the temporals inputs 422 are optional.

In some embodiments, the input layer includes exogenous inputs 424. Exogenous inputs 424 include additional factors which impact the predicted sales volume but are outside of the features learned by the non-linear cross-elasticities predictors. For example, weather events, pandemics (e.g., the COVID-19 pandemic), economic trends, or other idiosyncratic events, may have a significant impact on the predicted sales volume 412. The exogenous inputs 424 can include one or more variables or a vector which can be imposed on to accurately model such events. In some embodiments, the multi-item price-volume model 360 does not receive exogenous inputs 424 or exogenous inputs 424 are optional.

In some embodiments, the store indicator 426 identifies one or more stores from one or more retailers. In some embodiments, the store indicator 426 is a variable and in other embodiments the store indicator 426 is a vector. In some embodiments, store indicator 426 identifies a single store. In other embodiments, the store indicator 426 identifies a collection or stare (e.g., based on a distance to a customer user, grouping stores by region, etc.). In some embodiments, the multi-item price-volume model scales to a large number of stores from more than one retailer. In some embodiments where the store indicator includes stores from different retailers, the stores from different retailers may have overlap of items sold (e.g., the same type, brand, and size). In some embodiments, the different retailers may carry analogous items which are not exactly the same. For example, the same or similar type of item but with a different retailer specific brand. In these examples, items may be labeled, either manually or automatically, as being analogous for price-elasticity demand forecasting purposes. For example, different stores may carry different brands of the same type of item, which from a price-elasticity demand forecasting perspective may be determined to be analogous (e.g., different brands of milk, yogurt, sodas, etc.). In some embodiments, the multi-item price-volume model 360 may be used to determine which items at different retailers are analogues from a price-elasticity demand forecasting perspective and/or item cross dependency perspective.

Cost array 428 reflects costs for a plurality of items at the identified store(s) which are deliverable by the third party delivery service. In some embodiments, the cost array 428 includes a subset of items which are deliverable by the third party delivery service for the retailer. In some embodiments, the cost array 428 is generated based on pricing information retrieved from a retail computing system. In some embodiments, the cost matrix includes a field for each or a plurality of items, where the field stores a value indicating a cost of the item.

The markup array 430 reflects markup values for the plurality of items includes in the cost matrix. The markup array 430 includes markups which are simulated by the multi-item price-volume model 360 to determine the predicted sales volume 412.

The pre-trained effects layer 404 receives inputs from the input layer and generates the effects vector 408. In the example shown, the pre-trained effects layer 404 includes temporals effects 442, exogenous effects 444, store effects 446, and price effects 448. In some embodiments, the pre-trained effects layers includes approximating casual-modeling.

In some embodiments, the effects vector 408 is generated using an interrupted-training strategy where encoders (e.g., included as part of the pre-trained effects layer 404) for the inputs are sequentially pre-trained to model the incremental impact of independent factors, such as temporals, exogenous, store, item costs, applied markup, etc. In some embodiments, a decoder is trained to forecast the predicted sales volume 412. In some embodiments, the decoder is fine-tuned after the encoder is sequentially training on each of the inputs. In some embodiments, the adaptative approach to generating the effects vector 408 improves the computation efficiency of the multi-item price-volume predictor. In some embodiments, a transfer learning machine learning technique is used.

In some embodiments, the pre-trained effects layer 404 learns parameters to fit the inputs to effects by unfreezing relevant parameters, performing multiple passes with shuffled data, a few passes with ordered data, and then freezing the learned parameters. For example, pre-trained effects layer 404 may learn parameters to fit inputs to effects by first freezing all parameters, learning parameters to fit temporal inputs to the temporal effects (e.g., by unfreezing temporal effects parameters, performing multiple passes with shuffled data, performing a few passes with ordered data, and then and freezing the learned parameters), learning parameters to fit the exogenous inputs 424 to exogenous effects 444 (using the same or similar process as the temporal effects), learning parameters to fit the store indicator 426 to store effects 446 (using the same or similar process as the temporals effects), combining the cost array 428 and the markup array 430 and learning parameters to fit the combined arrays with the price effects 448 (using the same or similar process as outline for the temporal effects), and fine-tuning the network by performing multiple passes with shuffled data and few passes with ordered data through all of the learned parameters. In some embodiments, the multi-item price-volume predictor 410 is trained as part of the fine-tuning of the network to decode the effects vector 408 to predict sales volumes for the plurality of items. Once learned parameters frozen in the pretrained effects layer are used to transform inputs to effects and aggregate the effects in the effects vector 408.

The effects vector 408 is generated by applying the inputs form the inputs layer to the pre-trained effects layer 404. As described above, the pre-trained effects layer is trained to learn parameters which fit the inputs to the effects. The effects vector 408 is provided to multi-item price-volume predictor 410.

The multi-item price-volume predictor 410 is trained to identify price-demand effects for each of the plurality of items, while the other effects are controlled for by freezing the pre-trained layers. In some embodiments, this includes fine tuning multi-item price volume predictor 410 to uniquely capture the incremental impact of nonlinear price cross-elasticizes among a high number of items. In some embodiments, the multi-item price-volume predictor 410 identifies non-linear price-volume relationships for the plurality of items. In some embodiments, the multi-item price-volume predictor 410 identifies cross-dependencies between the plurality of items. In some embodiments, the multi-item price-volume predictor 410 is trained using historical transaction data. In some embodiments, the multi-item price-volume predictor 410 is dynamically trained as more transaction data is logged including transaction data where a previously determined optimal markup policy is implemented. This allows the system to automatically and dynamically price items at optimal values for the third party delivery service. In some embodiments, the multi-item price-volume predictor 410 is trained, at least in part, based on transaction data specific to the third party delivery service, such that the multi-item price-volume predictor 410 learns the third party delivery service's customers behavior.

In some embodiments, the multi-item price-volume predictor 410 is trained to decode the effects vector 408 to predict the predicted sales volume 412. In some of these embodiments, the multi-item price-volume predictor 410 is trained use observed sales volume effects of historical pricing based on historical transaction data from the retailers and/or the third party delivery service provider.

In some embodiments, the predicted sales volume 412 includes an array defining predicted volume for each of the plurality of items. In some embodiments, the predicted sales volume for each of the plurality of items is aggregated to determine a total revenue. In some embodiments, the multi-time price-volume predictor 410 outputs an output layer which includes multiple goals to be optimized simultaneously, for example sales volume, revenue, order frequency, new customers, etc.

In some embodiments, the multi-item price-volume model 360 Is trained using an interrupted-training strategy, such that the multi-item price-volume model 360 captures incremental contributions of independent inputs. Additionally, the multi-item price-volume model can include additive networks that are connected with fine-tuning layers.

In some embodiments, the forecasted demand output from multi-item price-volume model can be used in other contexts such as for managing supply chains (e.g., to avoid restocking problems), determining optimal delivery fees, determining optimal profiles for product catalogs, in-store pricing, determining product types, product quantities, store locations, etc. In some embodiments, similar modeling and optimization techniques can be implemented to predict an optimal delivery fee charged by the third party delivery service or an optimized subscription or other service fee charged by the third party delivery service.

FIG. 6 illustrates an example method 600 for simulating test markup policies to identify an optimized markup policy. In some embodiments, the method 600 is performed as part of the markup optimizer 120 (e.g., as shown in FIGS. 1 and 2). In some embodiments, the method 600 is part of the operations 304 and 306, as shown in the method 300 in FIG. 3. The method 600 includes the operations 602, 604, 606, 608 and 610. The operation 608 can include a crossover operation 612 and a mutation operation 614.

The operation 602 generates an initial generation of test markup policies. In some embodiments, a population of several different test markup policies with different arrangements of markups are generated. For example, one hundred different markup policies may initially be generated as part of an initial search generation. In some embodiments, the mark up values are constrained (e.g. the markups could be constrained from 0 to 30 percent markup). Additionally, the markups may be selected between discrete steps in the range (e.g., markups could be required to be selected from 5% steps within the range). In some embodiments, the constrains can be customized for each item. For example, constraints for 4 items can be defined as "[[0, 30], [0, 20], [0,0], [-10,10]]", where the third item is not allowed to have markups, and the 4th item can have either markdowns or markups up to 10%. In some embodiments, items which cannot have a markup are included to capture the cross-elasticity of demand for items which cannot have a markup as driven by the price of other items that can have a markup.

The operation 604 simulates the plurality of test markup policies test markup policy to predict sales volume effect of each markup policy. In some embodiments, the test markup policies are tested using the multi-item price-volume model 360, illustrated and described in reference to FIG. 5.

The operation 606 determines whether a termination criteria is satisfied. In some embodiments, the termination criteria is met when there is no generational improvements in predicted increases in sales volume. In some embodiments, the termination is satisfied after testing a predetermined number of generations (e.g., after reaching the 100th generation). Some embodiments include combinations thereof.

When the termination criteria is satisfied, the method 600 ends at the operation 610. When the termination criteria is not satisfied, the method 600 continues at the operation 608.

The operation 608 generates a new generation of test markup policies. In some embodiments, an evolutionary optimization algorithm is used. In some embodiments, the evolutionary optimization algorithm is a genetic algorithm. In some embodiments, the genetic algorithm mimics the evolution process in nature through evolving generations. Other types of evolutionary optimization algorithms can also be used, including particle swarm algorithms, ant-colony algorithms, etc. In some embodiments, a genetic algorithm used to generate the next generation of markup policies. In the embodiment shown, in order to generate a new generation of markup policies a crossover operation 612 is first applied to the current generation and then a mutation operation 614 is applied current generation. In some embodiments, selection rules select which of the markup policies in the generation apply the crossover operation 612, which of the markup policies in the generation to apply the mutation operation 614, and which markup policies remain the same based on the predicted sales volume output from the simulations. For example, the best markup policies may remain the same while the remaining markup policies will have one of or both of the crossover operation 612 and/or the mutation operation 614 applied to generate the next generation.

In some embodiments, the operation 608 includes a crossover operation 612. The crossover combines two parent markup policies to form children markup policies for the next generation. In some embodiments, a crossover ratio is used to determine a percentage of markup policies to crossover. For example a crossover ratio of 90% may be applied to a current generation of markup policies to generate the next generation of markup policies. An example of a crossover operation 612 is illustrated and described in reference to FIG. 7.

In some embodiments, the operation 608 includes a mutation operation 614. The mutation operation applies random changes to individual parent markup policies to form a child markup policy. In some embodiments, a mutation ratio is used to determine a number of current markup policies are to be mutated between generations. For example a mutation ratio of 50% may be applied to a parent generation to generate the next generation of markup policies. An example a mutation operation 614 is illustrated and described in reference to FIG. 8.

In some embodiments, methods from probability theory and bandit algorithms can be used to influence the probability of selecting an item for random changes markup changes. For example, if an item was frequently mutated at random during the previous generation, we can reduce the probability of it being selected again, relative to the probability of all other items, during the future generation. In some of these embodiments, the selection probabilities would be updated after each generation.

FIG. 7 is an example illustration for the crossover operation shown in FIG. 6. In the example shown, each parent markup policy includes 4 items with parent 1 having markup X applied to item 1, markup Y applied to item 2, markup Z applied to item 3, and markup K applied to item 4 and parent 2 having markup J applied to item 1, markup I applied to item 2, markup L applied to item 3, and markup M applied to item 4. Parent 1 and parent 2 are crossed over to generate child A and child B. Specifically, child A includes markup X applied to item 1 and markup k applied to item 4 (from parent 1) with markup I applied to item 2 and markup 1 applied to item 3 (from parent 2). Child B includes markup Y applied to item 2 and markup Z applied to item 3 (from parent 1) with markup J applied to item 1 and markup M applied to item 4 (from parent 2). In this manner the parent generation is evolved to generate a child generation. The same operation can be applied similarly to generations of any size to mix the markups from different parent markup policies.

Figure 8:
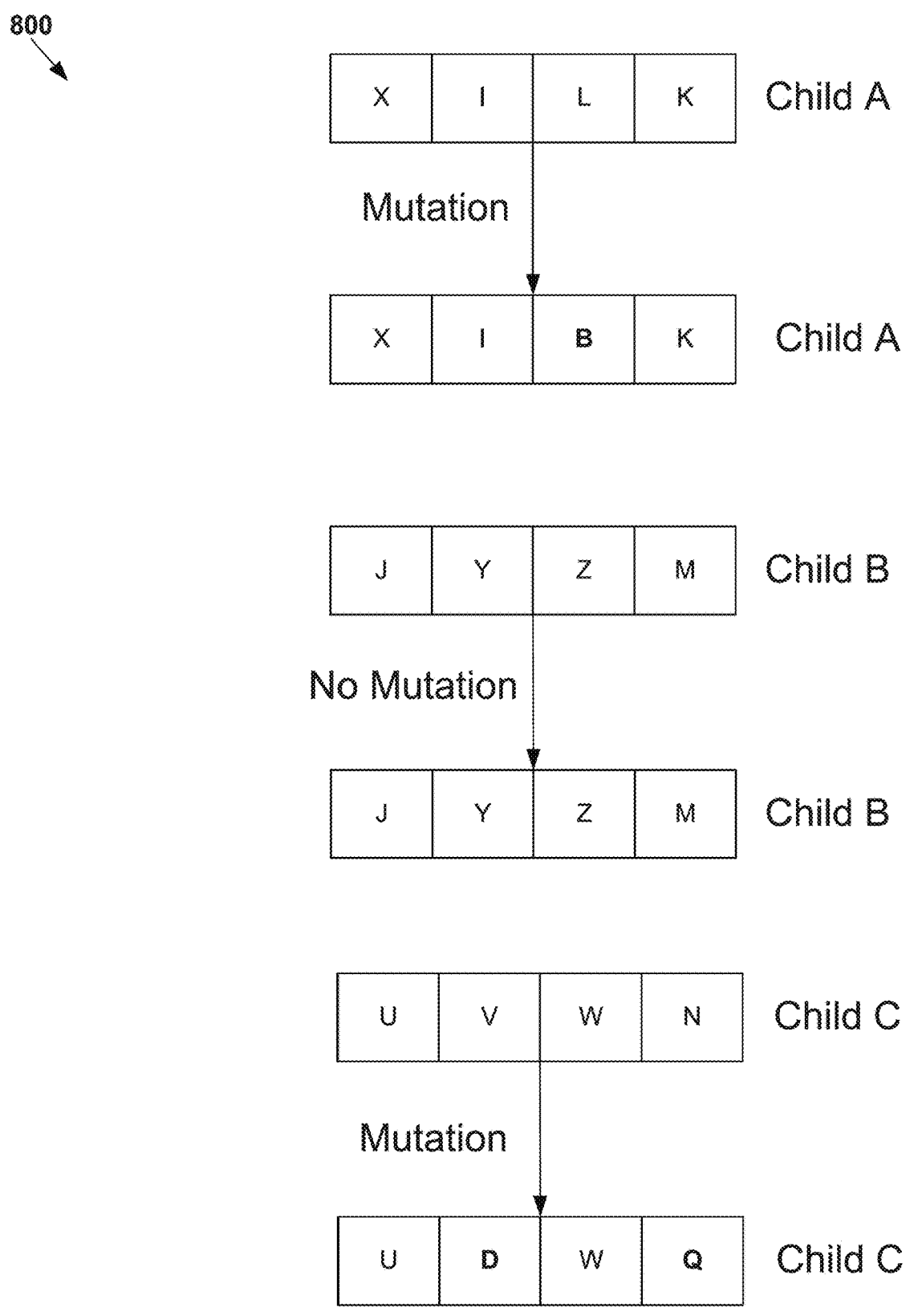

FIG. 8 is an example illustration for a mutation operation shown in FIG. 6. In the example shown child A and child B are generated form the crossover operation illustrated in FIG. 7. In the example shown, a mutation is applied to item 3 to mutate the markup for item 3 from markup L to markup B, for child A. In the example shown, no mutation is applied to child B. Child C shows an example mutation for a markup policy which was not crossed over. In this example child C starts with markup U applied to item 1, markup V applied to item 2, markup W applied to item 3, and markup N applied to item 4. A mutation is applied to item 2 to change the markup to markup D and item 4 modifying the markup from markup N to markup Q. In some embodiments adaptive mutations are applied to evolve each generation of markup policies.

Referring to FIGS. 7 and 8, in some embodiments, the crossover is applied to a set of the plurality of items based on a crossover ratio and a mutation is applied to a set of the plurality of items based on a mutation ratio. In typical embodiments, the cross-over ratio and mutation ration are independent. For example, a crossed-over child can also be mutated or a non-cross over child can be mutated. In some embodiments, the crossover operation always is performed first, with the crossed over children being placed in the same population with the non-crossed over children, then the mutation selection applies to a percentage (corresponding to the mutation ratio) of the combined population without discrimination of whether the child is a crossed-over child or a non-crossed over child.

Figure 9:
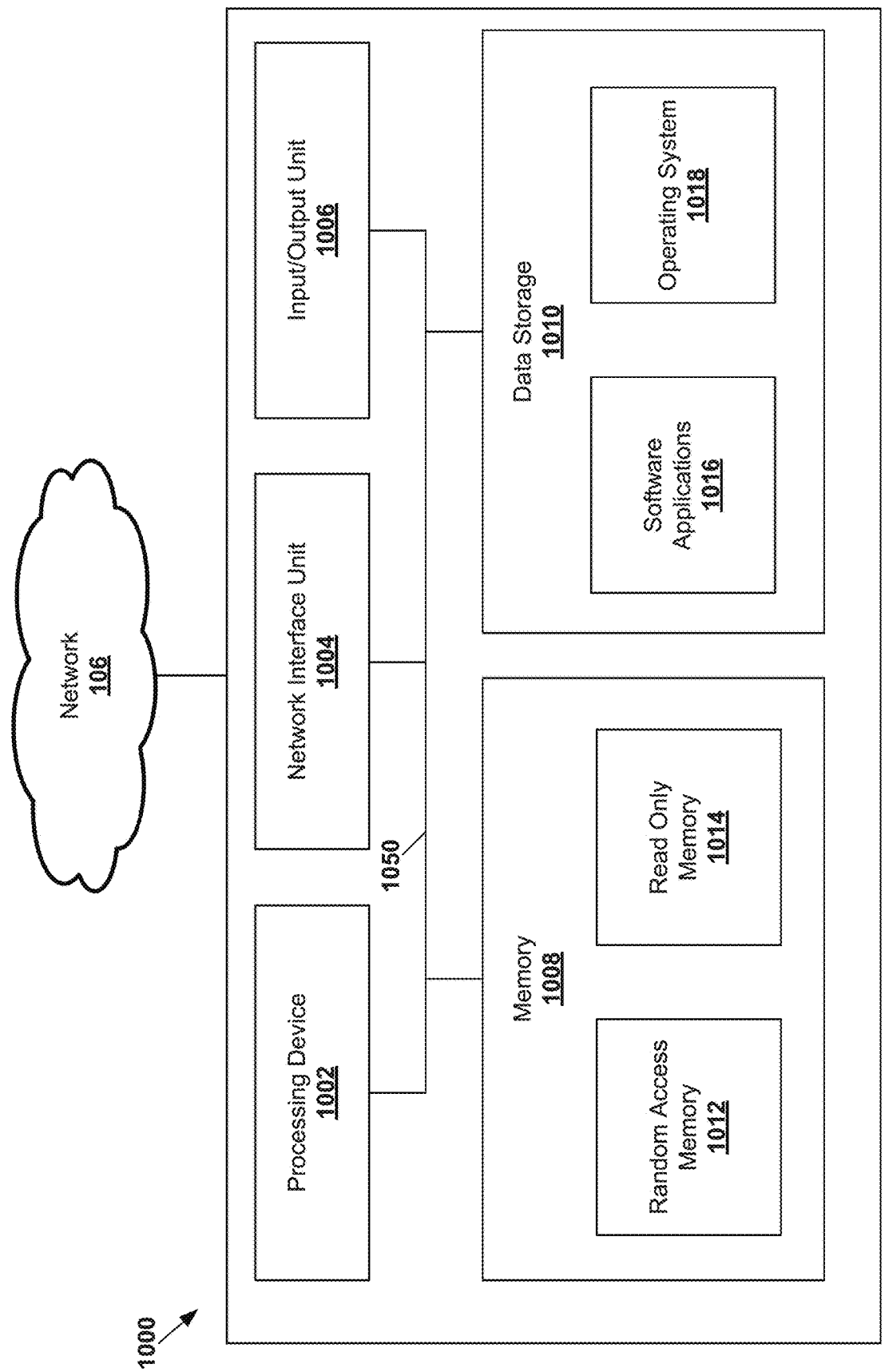
FIG. 9 illustrates a schematic diagram of an example computing device.

FIG. 9 illustrates a schematic diagram of an example computing device 1000. The example computing device is representative of the customer user computing device 108 and the delivery user computing device 112 of FIG. 1.

In the embodiment shown, the computing device 1000 includes a least one processing device 1002, a memory 1008, a system bus 1050, that couples the memory 1008 to the processing device 1002. The memory 1008 includes a random access memory ("RAM") 1012 and a read-only memory ("ROM") 1014. A basic input/output system that contains the basic routines that help to transfer information between elements within the computing device 1000, such as during startup, is stored in the ROM 1014. The computing device 1000 further includes data storage 1010. Data storage 1010 is able to store software instructions and data.

The data storage 1010 is connected to the processing device 1002 through a mass storage controller (not shown) connected to the system bus 1050. The data storage 1010 and its associated computer-readable storage media provide non-volatile, non-transitory data storage for the computing device 1000. Although the description of computer-readable storage media contained herein refers to a mass storage device, such as a hard disk or solid state disk, it should be appreciated by those skilled in the art that computer-readable data storage media can include any available tangible, physical device or article of manufacture from which the processing device 1002 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing device 1000.

According to various embodiments, the computing device 1000 can operate in a networked environment using logical connections to remote network devices through a network 106, such as a wireless network, the Internet, or another type of network. The computing device 1000 may connect to the network 106 through a network interface unit 1004 connected to the system bus 1050. It should be appreciated that the network interface unit 1004 may also be utilized to connect to other types of networks and remote computing systems. In some embodiments, the computing device 1000 also includes an input/output unit 1006 may provide output to a touch user interface display screen or other type of output device.

As mentioned above, the data storage 1010 and the RAM 1012 of the computing device 1000 can store software instructions and data. In some embodiments, the instructions include software applications 1016 and an operating system 1018 suitable for controlling the operation of the computing device 1000. The data storage 1010 and/or the RAM 1012 also store software instructions, that when executed by the processing device 1002, cause the computing device 1000 to provide the functionality discussed in this document.

FIG. 10 illustrates an example user interface 1100 for a third party delivery service. In some embodiments, the user interface 1100 is provided to a customer user computing device. The user interface 1100 includes a navigation bar 1102 and a search bar 1106 for browsing items to order or delivery by the third party delivery service provider. The user interface also includes a cart element 1108 displaying a current price of item selected by the user. The user interface 1100 displays tiles 1110 of various items that are sold and delivered by the third party delivery service. Each tile may include item information such as item name, an item image, whether the item is on sale, whether the item is on the cart ana price for the item. At least some of the items are displayed with a price that reflects the retail price of the item and a third party delivery service markup. In some embodiments, the third party delivery service markup reflects the optimized markup policy which may be determined using the methods and systems disclosed herein.

Figure 12:
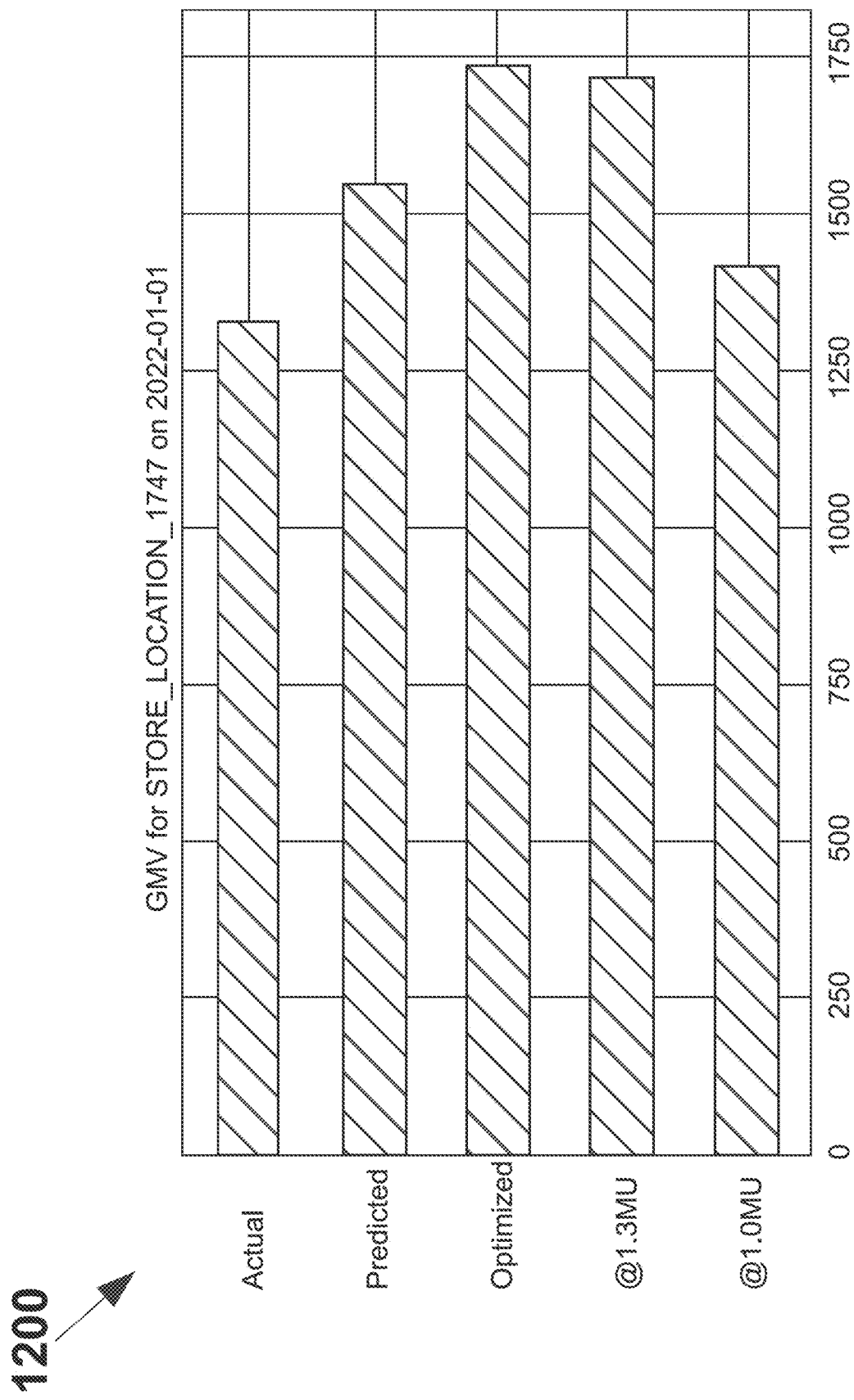
FIG. 12 is a chart illustrating gross merchandise value for a given store using different markup policies.
Figure 13:
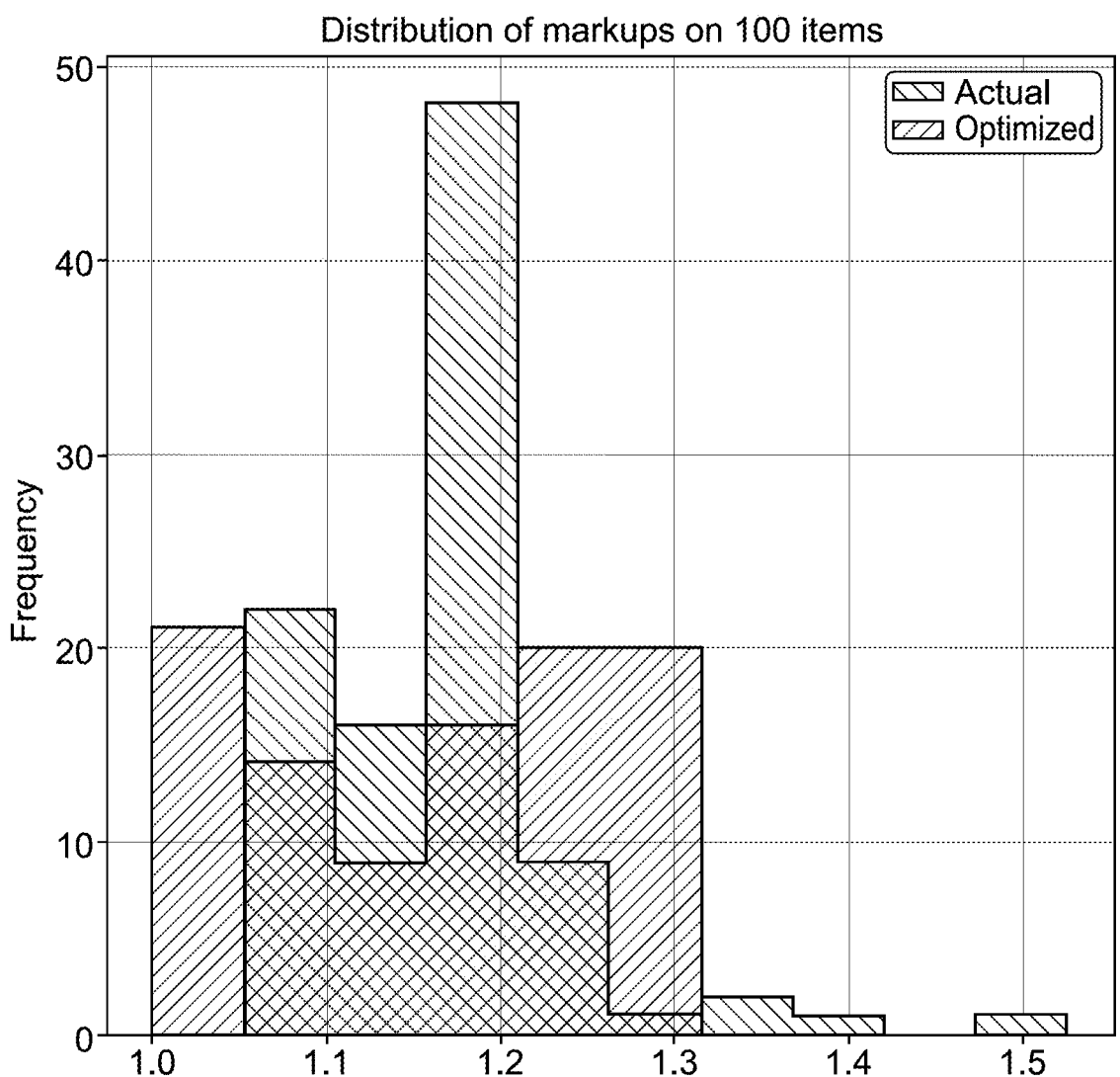
FIG. 13 is a chart illustrating a distribution of markups for different markup policies.

FIGS. 11-13 show example charts comparing different markup policies. In the examples shown, the results labeled "actual" are based on an implemented markup policy. The results labeled "predicted" are based on the implemented markup policy as forecasted by the multi-item price demand model (e.g., the multi-item price-volume model 360 illustrated and described in reference to FIGS. 4 and 5). The results labeled "optimized" are predicted outputs of the multi-item price demand model using an optimized markup policy (e.g., determined using the methods and systems disclosed herein. The results labeled "@1.3 MU" are predicted outputs from the multi-item price demand model when a 30% markup policy is applied to all items. The results labeled "@1.0 MU" are predicted outputs from the multi-item price demand model when a 0% markup policy is applied to all items (e.g., no markup applied).

FIG. 11. illustrates an example chart 1150 comparing different markup policies. In the example shown, the items are food items. The markup values displayed are the values which the retail price is multiplied by to determine the price presented by the third party delivery service. The chart includes an actual markup on a given date for a plurality of stores (column 0). The actual sales volume for each item (column 2) and actual gross merchandise value for each item ("GMV") (column 7), as derived from transaction data on the given day for the plurality of stores. Also shown are predicted sales volumes (column 3) and gross merchandise value (column 8) for the actual markup (column 0) as predicted by the multi-item price-volume model (e.g., the multi-item price-volume model 360 illustrated and described in reference to FIG. 5) given the actual markup (as shown in column 0).

In comparison, the chart shows an optimized markup applied to the pricing of each item (column 1) and predicted effects of the optimized mark up on sales volume (column 4) and gross merchandise value (column 9) as derived from the output of the multi-item price-volume model.

Also shown are predicted sales volume (Column 5) and gross merchandise value (column 10) when a markup of 30% is applied ("@1.3 MU") as predicted by the multi-item price-volume model. Similarly, predicted sales volume (column 6) and gross merchandise value (column 11) when no markup is applied ("@1.0 MU") as predicted by the multi-item price-volume model. In some embodiments, 30% represents a maximum markup allowed on 0% markup is a lower bound on a range of possible markups. In some examples, the comparing the values for gross merchandise value at 30% markup to the values at 0% can illustrate that the cross-elasticity for demand among the plurality of items is not a linear relationship. The example chart 1150 may only show a sample of items tested at a given time.

FIG. 12 is a chart 1200 illustrating gross merchandise value for a given store using different markup policies. The chart 1200 compares gross merchandise values under various markup policies (e.g., related to the policies shown in the chart 900 in FIG. 9). The chart shows gross merchandise value for an implemented markup policy (actual) as derived from transaction data, a predicted markup policy (predicted) as determined by the multi-item price-volume model with the implemented markup policy applied, an optimized markup policy (optimized) as predicted by the multi-item price-volume model with the optimal markup policy applied, a 30% markup policy (@1.3 MU) as predicted by the multi-item price-volume model with the 30% markup policy applied, and with no markup policy (@1.0 MU) as predicted by the multi-item price-volume model with the 0% markup policy applied. As shown in the chart the optimized markup policy results in the highest gross merchandise value.

FIG. 13 is a chart 1300 illustrating a distribution of markups on with different markup policies. The chart compares the distribution of markups for the implemented markup policy (shown as actual in FIGS. 9 and 12) with an optimized markup policy. As discussed above the optimized markup policy results in greater volume sales and a higher gross merchandise value as compared to the implemented markup policy. As can be shown in FIG. 13, the distribution of optimized markup policy is more evenly distributed from 0 to 30 percent resulting in more revenue generated by the third party delivery service. For example, as reflected by the frequency of items marked up by 20 to 30 percent.

As used herein, the term "engine" is applied to describe a specific structure for performing specific associated functions, such as a special purpose computer as programmed to perform algorithms (e.g., processes) disclosed herein. The engine can take any of a variety of structural forms, including: instructions executable to perform algorithms to achieve a desired result, one or more processors (e.g., virtual or physical processors) executing instructions to perform algorithms to achieve a desired result, or one or more devices operating to perform algorithms to achieve a desired result.

Where data structures are referred to, the data structure can be stored on dedicated or shared computer readable mediums, such as volatile memory, non-volatile, transitory, or non-transitory memory.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A method for training and implementing a neural network for dynamically optimizing prices by a third party delivery service, the method comprising:
    training the neural network to identify non-linear price-demand relationships between a plurality of items, wherein training the neural network comprises:
        receiving first training data from a first server associated with a first entity;
        receiving second training data from a second server, wherein the second server is not associated with the first entity;
        retrieving third training data from a data store of a third server associated with the third party delivery service;
        clustering the first training, the second training data, and the third training data to generate combined training data, wherein the clustering comprises joining first transaction data from the first training data with second transaction data from the second training data and third transaction data from the third training data based on item attributes in the first transaction data, the second transaction data, and the third transaction data;

sequentially training a plurality of encoders in a pre-trained effects layer of the neural network using the combined training data to model incremental impacts of inputs to an input layer of the neural network, wherein sequentially training the plurality of encoders in the pre-trained effects layer comprises:

freezing parameters of a first encoder of the plurality of encoders;

performing a plurality of passes with the combined training to update parameters of only a second encoder of the plurality of encoders;

shuffling the combined training data;

freezing the parameters of the second encoder of the plurality of encoders;

unfreezing the parameters of the first encoder of the plurality of encoders; and performing a second plurality of passes with the combined training data to update the parameters of only the first encoder of the plurality of encoders;

after sequentially training the plurality of encoders in the pre-trained effects layer, selecting an entity-specific objective for an output layer of the neural network for the first entity;

fine-tuning the neural network by freezing all layers of the neural network except a decoder that predicts the output layer; and performing a third plurality of passes with the combined training data to train only the decoder to optimize the entity-specific objective of the output layer;

retrieving item information for the plurality of items including pricing data, the plurality of items being sold by a retailer and available for delivery by the third party delivery service;

simulating a plurality of markup policies with the neural network, wherein simulating the plurality of markup policies comprises:

generating a first generation of markup policies;

using the neural network, generating a first set of predicted results for the first generation of markup policies, wherein generating the first set of predicted results comprises:

for each markup policy in the first generation of markup policies, executing a simulation for the markup policy, wherein executing the simulation for the markup policy comprises:

providing the markup policy to the input layer of the neural network;

applying, in the pre-trained effects layer of the neural network, the plurality of encoders to data received at the input layer, the data received at the input layer including the markup policy, to generate a vector representation of the data received at the input layer; and based in part on the vector representation, predicting a result for the markup policy;

using the first set of predicted results, generating a second generation of markup policies derived from the first generation of markup policies; and using the neural network, generating a second set of predicted results for the second generation of markup policies;

determining, as part of simulating the plurality of markup policies, an optimal markup policy for the third party delivery service;

providing a user interface to a customer computing device for a customer of the first entity;

retrieving item data for the first entity for items selected by the customer;

applying, in real time, the optimal markup policy to the item data; and displaying, in real time, updated prices reflecting the markup policy for the items selected by the customer in the user interface.

2. The method of claim 1, wherein the neural network is trained to determine cross-dependencies between the plurality of items as part of identifying the price-demand relationships.

3. The method of claim 1, wherein the neural network is a deep convolutional neural network.

4. The method of claim 1, wherein the neural network is dynamically updated based on updated transaction data.

5. The method of claim 4, wherein the optimal markup policy is updated periodically.

6. The method of claim 1, wherein the neural network is further configured to predict future pricing and the user interface further displays a predicted future price for at least one item.

7. The method of claim 1, wherein the plurality of items are clustered into groups of items and the plurality of items are simulated on a per group basis.

8. The method of claim 1, wherein the neural network is further trained on observed customer behavior of one or more customers using a third party delivery service application.

9. The method of claim 1, wherein the plurality of items includes every item in a catalog of items that are available for delivery by the third party delivery service.

10. The method of claim 1, wherein the non-linear price-demand relationships between the plurality of items are identified simultaneously by the neural network.

11. The method of claim 1, wherein the pricing data is for a specific date and a specific retail store of the retailer.

12. The method of claim 1, wherein the first encoder of the plurality of encoders is configured to receive a first subset of data of the data received at the input layer;

wherein the second encoder of the plurality of encoders is configured to receive a second subset of data of the data received at the input layer, the second subset of data being different from the first subset of data; and wherein the parameters of the first encoder of the plurality of encoders are different from the parameters of the second encoder of the plurality of encoders.

13. The method of claim 12, further comprising retrieving second item information for a second plurality of items including second pricing data, the second plurality of items being sold by a second retailer and available for delivery by the third party delivery service, wherein the second retailer is different from the retailer, and wherein the second plurality of items includes items that are not included in the first plurality of items;

wherein simulating the plurality of markup policies with the neural network comprises inputting, into the neural network, the item information for the plurality of items sold by the retailer and the second item information for the second plurality of items sold by the second retailer;

wherein the first subset of data is a store indicator identifying a store from one or more of the first retailer or the second retailer;

wherein the first encoder is trained to receive the store indicator and generate store effects; and wherein the neural network is trained to determine, based at least in part on the store effects, that a price elasticity of a first item of the first plurality of items corresponds to a price elasticity of a second item of the second plurality of items, the first item being different from the second item.

14. A system for training and implementing a neural network of a third party delivery system, the system comprising:

at least one processing device;

at least one memory device storing instructions which, when executed by the at least one processing device, cause the third party delivery service system to:

train the neural network to identify non-linear price-demand relationships between a plurality of items, wherein training the neural network comprises:

generating combined training data by joining first transaction data received from a first entity with second transaction data received from a second entity and third transaction data of the third party delivery system based on item attributes, wherein the first entity is different from the second entity;

sequentially training a plurality of encoders in a pre-trained effects layer of the neural network using the combined training data to model incremental impacts of inputs to an input layer of the neural network, wherein sequentially training the plurality of encoders in the pre-trained effects layer comprises:

freezing parameters of a first encoder of the plurality of encoders;

performing a plurality of passes with the combined training to update parameters of only a second encoder of the plurality of encoders;

shuffling the combined training data;

freezing the parameters of the second encoder of the plurality of encoders;

unfreezing the parameters of the first encoder of the plurality of encoders; and performing a second plurality of passes with the combined training data to update the parameters of only the first encoder of the plurality of encoders;

after sequentially training the plurality of encoders in the pre-trained effects layer, selecting an entity-specific objective for an output layer of the neural network for the first entity;

fine-tuning the neural network by freezing all layers of the neural network except a decoder that predicts the output layer; and performing a third plurality of passes with the combined training data to train only the decoder to optimize the entity-specific objective of the output layer;

retrieve item information for the plurality of items including pricing data, the plurality of items being sold by a retailer and available for delivery by a third party delivery service associated with the third party delivery service system;

simulate a plurality of markup policies with the neural network, wherein simulating the plurality of markup policies comprises:

generating a first generation of markup policies;

using the neural network, generating a first set of predicted results for the first generation of markup policies, wherein generating the first set of predicted results comprises:

for each markup policy in the first generation of markup policies, executing a simulation for the markup policy, wherein executing the simulation for the markup policy comprises:

providing the markup policy to the input layer of the neural network;

applying, in the pre-trained effects layer of the neural network, the plurality of encoders to data received at the input layer, the data received at the input layer including the markup policy, to generate a vector representation of the data received at the input layer; and based in part on the vector representation, predicting a result for the markup policy;

using the first set of predicted results, generating a second generation of markup policies derived from the first generation of markup policies; and using the neural network, generating a second set of predicted results for the second generation of markup policies;

determine, as part of simulating the plurality of markup policies, an optimal markup policy for the third party delivery service; and provide a user interface to a customer computing device for a customer of the first entity;

retrieving item data for items viewed by the customer;

applying, in real time, the optimal markup policy to the item data; and displaying, in real time, updated prices reflecting the optimal markup policy for the items viewed by the customer in the user interface.

15. The third party delivery service system of claim 14, wherein the neural network is trained to determine cross-dependencies between the plurality of items as part of identifying the price-demand relationships.

16. A non-transitory computer-readable medium comprising computer-executable instructions which, when executed by a computing system cause the computing system to:

train a neural network to identify non-linear price-demand relationships between a plurality of items, wherein training the neural network comprises:

generating combined training data by joining first transaction data received from a first entity with second transaction data received from a second entity and third transaction data of the third party delivery system based on item attributes, wherein the first entity is different from the second entity;

sequentially training a plurality of encoders in a pre-trained effects layer of the neural network by using the combined training data, wherein sequentially training the plurality of encoders in the pre-trained effects layer comprises:

freezing parameters of a first encoder of the plurality of encoders;

performing a plurality of passes with the combined training to update parameters of only a second encoder of the plurality of encoders;

freezing the parameters of the second encoder of the plurality of encoders;

unfreezing the parameters of the first encoder of the plurality of encoders; and performing a second plurality of passes with the combined training data to update the parameters of only the first encoder of the plurality of encoders;

fine-tuning the neural network by freezing all layers of the neural network except a decoder that predicts, for an output layer of the neural network, an entity-specific objective of the first entity; and performing a third plurality of passes with the combined training data to train only the decoder to optimize the entity-specific objective of the output layer;

retrieve item information for a plurality of items including pricing data, the plurality of items being sold by a retailer and available for delivery by a third party delivery service;

simulate a plurality of markup policies with the neural network, wherein simulating the plurality of markup policies comprises:

generating a first generation of markup policies;

using the neural network, generating a first set of predicted results for the first generation of markup policies, wherein generating the first set of predicted results comprises:

for each markup policy in the first generation of markup policies, executing a simulation for the markup policy, wherein executing the simulation for the markup policy comprises:

providing the markup policy to the input layer of the neural network;

applying, in the pre-trained effects layer of the neural network, the plurality of encoders to data received at the input layer, the data received at the input layer including the markup policy, to generate a vector representation of the data received at the input layer; and based in part on the vector representation, predicting a result for the markup policy;

using the first set of predicted results, generating a second generation of markup policies derived from the first generation of markup policies; and using the neural network, generating a second set of predicted results for the second generation of markup policies;

determine, as part of simulating the plurality of markup policies, an optimal markup policy for the third party delivery service; and provide a user interface to a customer computing device for a customer of the first entity;

retrieve item data for items viewed by the customer;

apply, in real time, the optimal markup policy to the item data; and display, in real time, updated prices reflecting the optimal markup policy for the items viewed by the customer in the user interface.

17. The non-transitory computer-readable medium of claim 16, wherein to simulate the plurality of markup policies includes to:

search for the optimal markup policy with an evolutionary optimization algorithm, wherein the evolutionary optimization algorithm is used to generate the plurality of markup policies.

18. The non-transitory computer-readable medium of claim 16, wherein the neural network is trained to determine cross-dependencies between the plurality of items as part of identifying the price-demand relationships.

* * * * *